Figure 1:
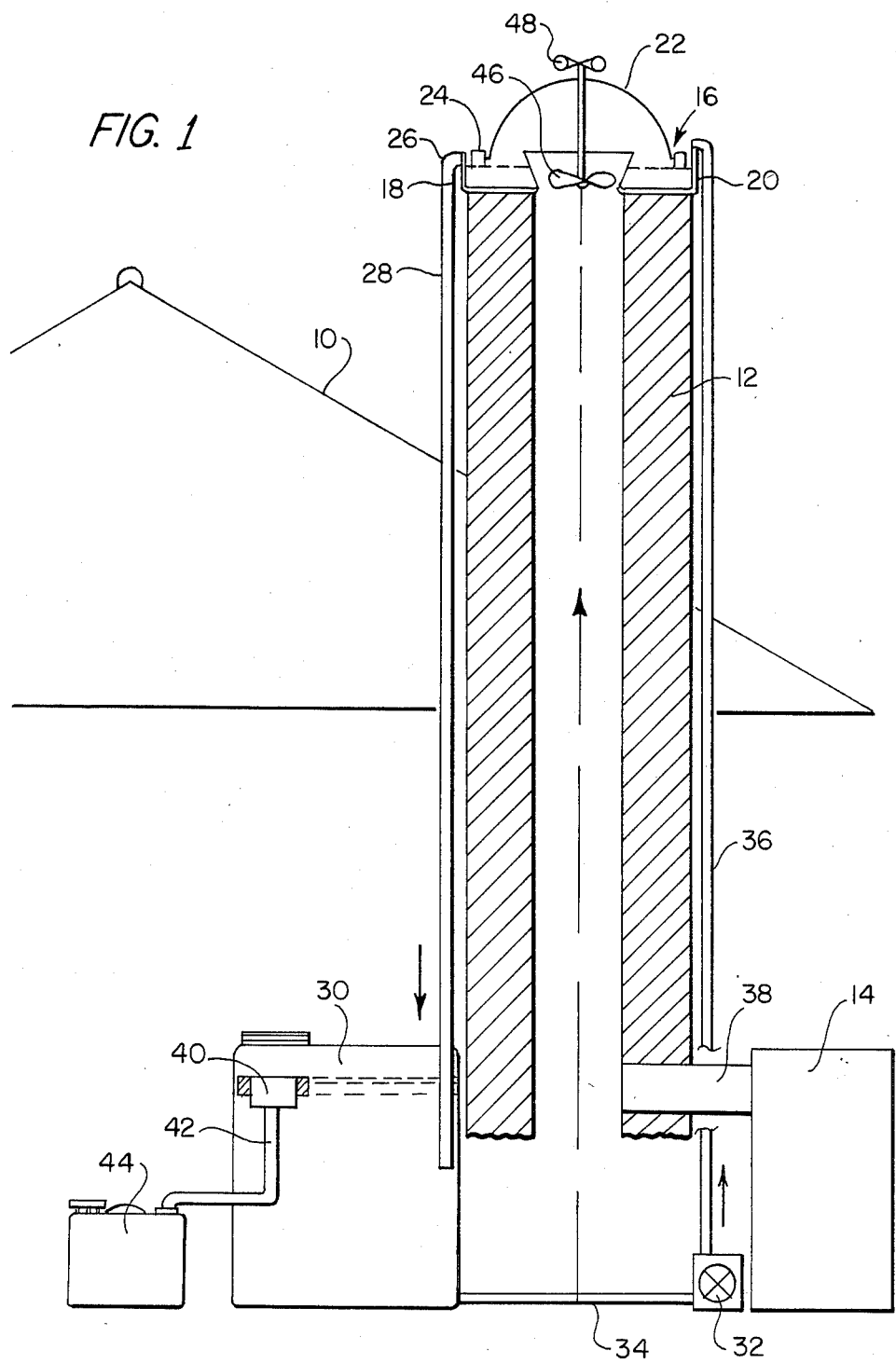

United States Patent [19]

Mauerhoff

[11] Patent Number: 4,801,315
[45] Date of Patent: Jan. 31, 1989

[54] DEVICE FOR THE WET CLEANING OF FLUE GAS

[76] Inventor: Wolfgang Mauerhoff, Limburger Strasse 15, D-6240 Königstein, Fed. Rep. of Germany

[21] Appl. No.: 937,545

[22] Filed: Dec. 3, 1986

[51] Int. Cl.[4] ............... B01D 47/02; B01D 47/04
[52] U.S. Cl. .................. 55/228; 55/229; 55/233; 55/245; 55/256; 55/260; 261/120; 261/126
[58] Field of Search ............... 55/228, 229, 233, 234, 55/240, 241, 244, 247, 256, 260; 261/120, 126

[56] References Cited

U.S. PATENT DOCUMENTS

| | | | |
|---|---|---|---|
| 314,498 | 3/1885 | Van Gelder | 261/120 |
| 475,972 | 5/1892 | Badlam | 55/234 |
| 1,286,951 | 12/1918 | Davies | 261/120 |
| 1,404,998 | 1/1922 | Pappanikolaou | 261/126 |
| 1,465,475 | 8/1923 | Hope | 261/126 X |
| 1,800,395 | 4/1931 | McCandless | 261/126 X |
| 2,004,467 | 6/1935 | Hawley | 55/229 X |
| 3,045,990 | 7/1962 | Keenan, Jr. | 261/126 X |
| 3,460,819 | 8/1969 | Pike | 55/240 X |
| 3,561,735 | 2/1971 | Smith | 261/126 X |
| 3,648,439 | 3/1972 | Szczepanski | 55/233 X |
| 3,675,396 | 7/1972 | Hawryluk et al. | 55/229 X |
| 3,873,284 | 3/1975 | Aguas | 55/260 X |
| 4,005,999 | 2/1977 | Carlson | 55/244 X |
| 4,472,324 | 9/1984 | Hawryluk | 55/229 X |
| 4,528,005 | 7/1985 | Baxter | 55/256 X |
| 4,529,421 | 7/1985 | Parma | 55/229 X |

FOREIGN PATENT DOCUMENTS

| | | | |
|---|---|---|---|
| 966559 | 8/1957 | Fed. Rep. of Germany | 55/229 |
| 621882 | 6/1961 | Italy | 55/256 |

Primary Examiner—Robert Spitzer
Attorney, Agent, or Firm—Larson and Taylor

[57] ABSTRACT

The device for the wet cleaning of flue gas is mounted on a chimney (12). It consists of a basin (18) surrounding the flue gas pass in a ring shape with a cleaning fluid (20). A hood covering the flue gas pass (22) guides the flue gas through the cleaning fluid (20). A turbulence device (24) is foreseen on the edge of the hood (22), this ensuring intensive contact of the flue gas with the cleaning fluid. The turbulence device may consist of numerous convoluted sheets maintained in concentric, vertical arrangement which are located in a hollow space closed at the top and form concentric, vertical stream channels. The flue gas streams into these channels which are moistened and filled with bubbles alternately upwards and downwards.

13 Claims, 3 Drawing Sheets

DEVICE FOR THE WET CLEANING OF FLUE GAS

The invention is concerned with a device for the wet cleaning of flue gas led through a flue gas pass consisting of a hood covering the flue gas pass and a basin surrounding it in a ring shape containing cleaning fluid.

Such a device is described in the U.S. Pat. No. 3,045,990. It functions in the way that the flue gas to be cleaned is guided along the surface of a cleaning fluid. A large part of the flue gas does not come into contact with the cleaning fluid at all in doing this so that the cleaning effect is appropriately bad.

The same is valid also for a further known cleaning device in accordance with the German utility model No. 74 21 406. There the cleaning fluid runs down corrugated sheets between which there are stream channels with even cross-section from top to bottom through which the flue gas flows. Hereby although the distance which the flue gas flows along the surface of the fluid is somewhat longer even so a large part of the flue gas does not come into contact with the cleaning fluid in so doing.

Finally it is already also known by way of the German patent application No. 26 00 407 that flue gas can be sucked through a cleaning fluid contained in a basin by means of a fan whereby the gas is forced to stream around the lower edge of a sheet vane protruding into the cleaning fluid. This happens, however, only at a single point on the sheet vane and practically in the form of an uninterrupted gas stream or in the form of very large gas bubbles so that the flue gas on the other hand has only a small opportunity of coming into contact with the fluid and of being thoroughly cleaned.

The invention is, therefore, based on the task of creating a device of the type quoted at the beginning which ensures an effective cleaning of the flue gas by very simple means which require only a small amount of space.

The aforementioned task is solved in accordance with the invention in that the edge of the hood extends all round a little beneath the surface of a cleaning fluid containing a foam forming additive and is designed as a turbulence device, which guides the flue gas on its stream path beneath the surface of the cleaning fluid several times.

The proposed device offers the advantage that the flue gas need only be submerged along the relatively large length of the circumference of the hood only a little beneath the surface of the cleaning fluid. Thus, the flue gas produces the foam itself as a consequence of the foam forming additive in the cleaning fluid by which it is also effectively cleaned outside of the cleaning fluid. As the flue gas is already cleaned by only slight submersion in the cleaning fluid and furthermore by the foam formed hereby, the stream resistance created by the device in accordance with the invention is slight so that in many cases no additional fan for the support of the natural upward drive force in the chimney is required.

The ring shaped turbulence device which serves the purpose of the fine distribution of flue gas in the cleaning fluid, can be realised in various versions. In principle, the turbulence device can be held firmly in stationary position or alternatively float on the fluid surface. In the latter case, the maintenance of a certain level of fluid in the basin need not be adhered to so precisely. A turbulence device in the shape of a ring floating on the surface of the fluid e.g. made of plastic foam, which is sealed off from the hood by means of a flexible membrane on its upper face, offers in addition the further advantage that the ring which is vigorously moved by the gas bubbling through beneath it, causes additional turbulence of the flue gas in the fluid due to its movement.

The cleaning effect can be increased further both for stationary as also for floating turbulence devices in that several concentric, annular ribs arranged with radial spacing extend below the surface of the fluid so that the flue gas is forced to submerge below and through the various ribs several times through the cleaning fluid. This takes place in the form of a turbulent stream which leads to an intensive contact between the gas and the fluid. The annular ribs and the basin may have a circular, oval or polygonal outline.

The bottom edge of the annular ribs which extend into the cleaning fluid may be fitted with a variety of slots, teeth and other irregularities for the turbulent splitting of the gas stream.

The cleaning fluid contains, in accordance with the invention, foam forming additives. In particular, fine bubbled foam assures a large surface area of the fluid and thus a good cleaning effect. For the exploitation of this effect the invention foresees in its preferential version that the annular ribs of the turbulence device consist of several concentric, vertically arranged laminations, whose intermediate spaces are connected at the top by a common, closed hollow space, whereby the laminations are shaped preferably in an accordion shape with ring-shaped, all round convolutions and the convolution peaks of the neighbouring laminations form constrictions in the intermediate spaces. As the intermediate spaces between the convoluted laminations at the same height at the top as well as at the bottom each have alternately wide and narrow ring-shaped openings from the radial inside to radial outside, numerous stream channels result with alternately rising and falling directions of stream and filled with fluid bubbles, whereby the constrictions in the intermediate spaces alternating with widenings assure turbulence of the stream.

The preferred area of application of the new cleaning device is oil-firing units which contribute to environmental pollution to a special degree. It is, however, self evident the invention is suitable for the cleaning of other industrial and household exhaust gases on the same principle of design of the device, in particular if these contain soot and other solid particles. For this the chimney suction and the burner fan may already be sufficient to force the exhaust gas through the cleaning fluid. Should, however, faults in the discharge of flue gas occur in individual cases these can easily be rectified by an additional fan at the head of the chimney, which can be arranged in the direction of stream either before or after the cleaning bath. Either a motor or wind power can be adopted for driving the fan.

A further possible addition to the separator in accordance with the invention is exploited by the heating up of the cleaning fluid by the flue gases and foresees that the return line guides the cleaning fluid from the ring-shaped basin at the head of the chimney to a larger collection tank downwards, via a heat exchanger e.g., a heat pump. In this case, it is practicable to fit the return line with a thermal insulation jacket and where necessary to lay it on the inside of the chimney.

The collection tank mentioned is preferably to be connected to an oil slurry separator. The dirt contamination which collects e.g., oil, soot, sulphuric acid etc., should be made re-useable if possible by recycling.

Finally, the invention is suitable for the spraying of a limited quantity of fluid in atomised form at a short distance behind the heating boiler into the hot flue gas. This fluid is swept along by the flue gas and precipitates in particular at the top end of the chimney on the hood and in the ring-shaped basin with cleaning fluid.

The condensate which drops onto the chimney walls must be trapped at the bottom end of the chimney and fed to the collection tank.

Figure 2:
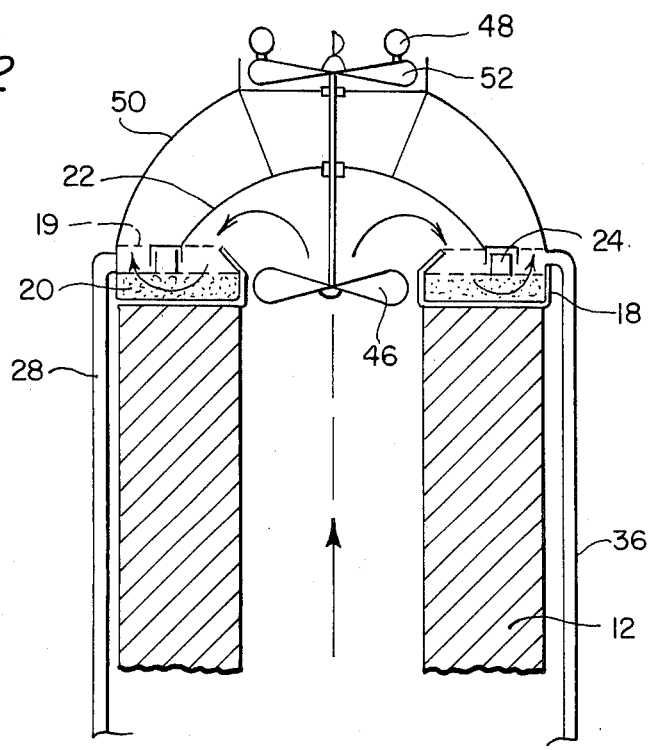
Figure 3:
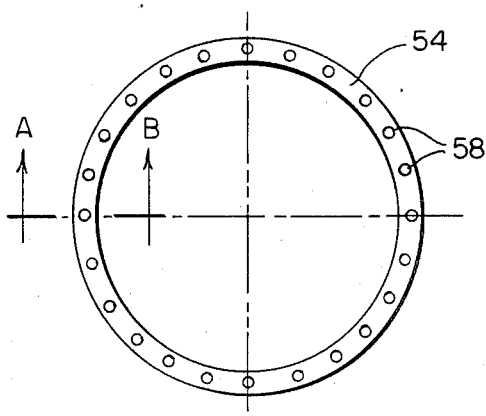
Figure 4:
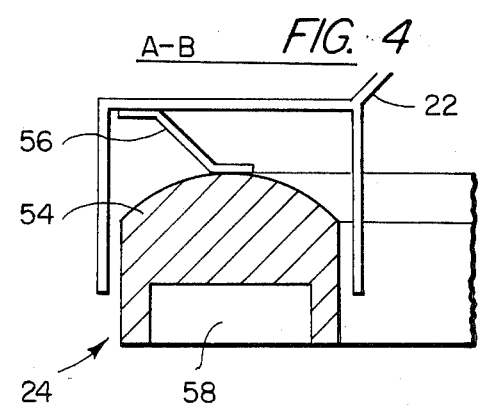
Figure 5:
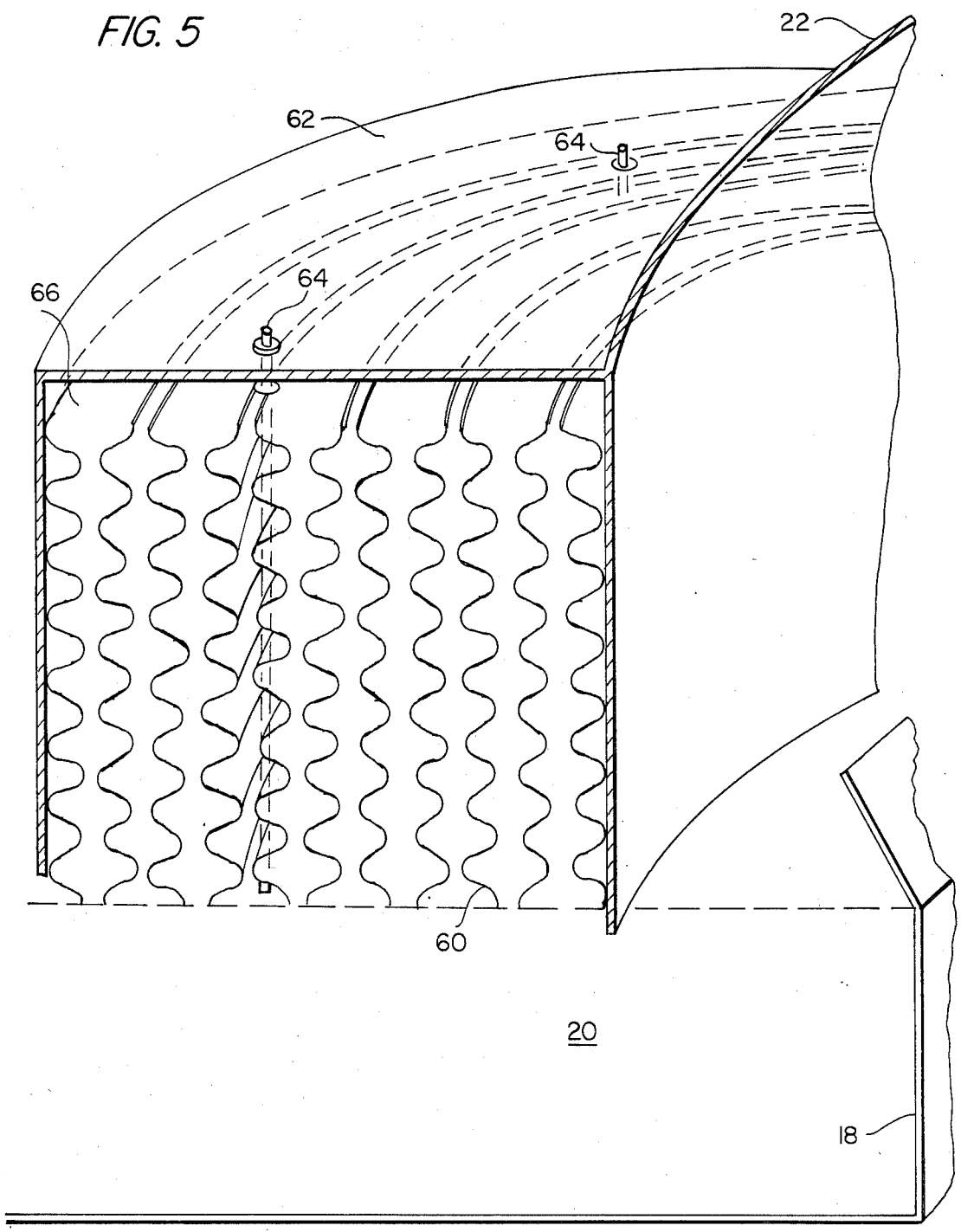

The invention is explained in more detail using the drawing as follows. The following is shown:

FIG. 1 A vertical section through a domestic chimney with a flue gas cleaning device in accordance with the invention;

FIG. 2 a vertical section through a further design example of the cleaning device in accordance with the invention;

FIG. 3 a view from below of a floating ring serving the purpose of a turbulence device which is part of the devices in accordance with FIG. 1 and FIG. 2;

FIG. 4 a section along section line A-B in FIG. 3;

FIG. 5 a part section through a further design example of a turbulence device.

A building is signified in FIG. 1 at 10 with a chimney 12. A heating boiler 14 with oil burner is connected at the bottom onto chimney 12. Normally, the flue gases from heating boiler 14 escape together with the impurities which they contain at the top end of the chimney without hindrance into the atmosphere. This should be prevented in the chimney shown with flue gas cleaning device 16 mounted on it.

The cleaning device 16 consists mainly of a ring-shaped basin 18 surrounding the flue gas pass of the chimney 12 with a cleaning fluid 20. A hood 22, covering the flue gas pass, is supported on the basin 18 by means of supports which are not shown. The bottom edge of the hood 22 is fitted with turbulence device 24 which submerges into the cleaning fluid 20. The fluid level of the cleaning fluid is determined by an overflow opening 26 which is connected via a return line 28 with a collection tank 30 which can be erected e.g., in the cellar of the building. A delivery pump 32 draws off fluid from the collection tank 30 via a filter which is not shown and a line 34 and feeds it in a circuit via a feedline 36 back to the ring-shaped basin 18. If desired, to the cleaning fluid which has been taken from collection tank 30, cleaning fluid can be added which is sucked in from a non-illustrated reservoir via pump 32. Furthermore a branch line of the feedline 36 could exit via a spray nozzle in the flue gas pipe 38 between the heating boiler 14 and the chimney 12 if cleaning fluid is to be fed in already at this point to the flue gas, the cleaning fluid then precipitating in the chimney on the hood 22 and in the basin 18 and being regained.

As the design example shows, the device has an open circulating system of the cleaning fluid. The open ring-shaped basin 18 on the external edge can be covered over with a filter 19 with a drip trap. The filter or a fine filter grid mat serves the purpose of limiting the height of the foam. This function can be improved further by electrically charging the grid wires. The height of the foam can be limited by these measures to e.g., 20 cm. above the level of the fluid. The collection tank 30 is also open to the outside atmosphere. Non-illustrated measuring instruments indicate the increasing contamination of the cleaning fluid in collection tank 30. The oil slurry floating on the surface is drawn off by a floating separator 40 via a flexible hose 42 to a special replacement tank 44.

If necessary, the chimney draught can be strengthened by e.g., a fan 46 located on the hood 22 or the basin 18, which is driven by a wind wheel 48 and/or an electric motor e.g., with 220 volt AC or 12 volt DC current. However, even the pressure difference produced by the burner fan on heating boiler 14 and the upward drive in the chimney 12 between the inside and outside face of the hood 22 may suffice to force the flue gas through the cleaning fluid under and through the turbulence device 24. To increase the gas stream the internal wall of the ring-shaped basin 18 can be widened from the bottom towards the top conically as is shown in FIG. 1.

The design example in accordance with FIG. 2 differs from that in accordance with FIG. 1 only in that the radial external area of the basin 18 and the hood 22 are covered by a further hood 50. The latter has a central outlet opening in which a further fan wheel 52 is arranged which can be driven together with the fan wheel 46.

The turbulence device 24 consists in the designs in accordance with FIG. 1 and FIG. 2, of a ring 54 floating on the cleaning fluid 20 being made of plastic foam, e.g., polystyrol. The top face of the ring 54 is connected lengthwise along its entire perimeter tightly with an elastic membrane 56 e.g., made of rubber, whose other end is connected tightly with the edge of the hood 22. Thus it is prevented that flue gases escape from between the ring 54 and the hood 22. The edge of the hood 22 forms an open frame at the bottom in accordance with FIG. 4 in which the floating ring 54 is guided radially.

In the illustrated design example in accordance with FIG. 3 and 4, the floating ring 54 is fitted with a variety of blind holes 58 on its bottom face. Alternatively or additionally, the bottom face of the ring 54 could be fitted with concentric annular ribs extending downwards. Apart from this a diversion of the stream gases from the radial direction of stream can be achieved by ribs or other vane elements attached to the bottom face of the ring 54. The purpose of all these measures consists in forcing the flue gas into a turbulent stream repeatedly below the surface of the fluid. In this case, the movement of the floating ring 54 in vertical and horizontal direction caused by the uneven gas stream itself adds to the turbulence.

The devices described in conjunction with FIG. 1 and 2 are suitable also for chimneys with several flue gas passes arranged next to one another. In this way, the possibility exists of surrounding these with a common ring-shaped basin and covering them with a common hood, whereby the outline of the basin can be adapted to the cross-section of the chimney. Alternatively, however, each of the flue gas passes can also have its own device in accordance with FIG. 1 and an external hood 50 in accordance with FIG. 2 can also be available for all flue gas passes mutually.

FIG. 5 illustrates, in place of the floating turbulence ring 54, in accordance with FIG. 4 a further design example of a turbulence device 24. In this case it is firmly connected to the hood 22 i.e., stationary. The level of the fluid is regulated e.g., by an overflow opening appropriate to the overflow opening 26 described in conjunction with FIG. 1 to a certain level, at which the bottom edges of a number of vertically arranged convoluted sheets 60 are just submerged a little into the cleaning fluid 20. The edge of the hood 22, on the other hand, forms an all round frame 62 which is open at the bottom, whose inner hollow space accommodates the convoluted sheets 60. These are fixed by means of vertical distance and fixture bolts 64 with the desired mutual radial intermediate spacing to the frame 62 connected with the hood 22. As the convoluted sheet 60 arranged on the far left with reference to FIG. 5 show best of all, the top edges of all the sheets are located at a certain distance below the cover on the inner hollow space of frame 62 in mounted condition so that a free hollow space 66 exists over the sheets which connects the intermediate spaces between the sheets 60 with one another.

As FIG. 5 shows further, the radially innermost convoluted sheet 60 lies tightly up against the radially internal wall of the frame 62. The radially outermost convoluted sheet lies in an appropriate manner tight up against the radially external wall of the frame 62. The convoluted shape of all sheets 60 is uniform and the arrangement has been so made that the convolutions of the sheets always form alternately constrictions with a clear width of only a few millimeters and wide areas whose passage cross-section for a vertical stream is e.g., about ten times as large as at the constrictions, in the intermediate space between neighbouring sheets from top to bottom. The intermediate spaces between the sheets have alternatingly one wide and one narrow opening at the bottom and top whereby the intermediate spaces with a lower wide opening have a narrow opening at the top and vice versa. The intermediate spaces between the convoluted sheets 60 form vertical, ring-shaped, concentric stream channels, whereby the radially innermost stream channel has a wide opening at the bottom and the radially outermost stream channel a narrow opening at the bottom.

Flue gas, which is forced between the internal and the external face of the hood 22 onto the radially internal ring wall of the frame 62 beneath the surface of the fluid due to the pressure difference, rises in the stream channel which is wide open at the bottom between the two radially innermost convoluted sheets 60 into the upper hollow space 66. In so doing the gas carries fluid along with it and moistens the walls of the sheets 60. As the cleaning fluid 20 contains foam forming additives e.g., soap suds, the intermediate space between the sheets 60 fills with foam bubbles. The alternation between constrictions and wide areas causes a turbulence stream and intensive contact of the flue gas with the large fluid surface on the convoluted sheets and the foam bubbles.

A part of the flue gas also flows below the radially innermost, vertical stream channel of the convoluted sheet 60 radially outwards. As a consequence of the length of the perimeter increasing together with the radius and the loss of stream energy, the radial stream speed thus slows down. The flue gas and the fluid swept along with it which have risen up to the inner hollow space 66 in the radially innermost stream channel, therefore flow back down in the next ring-shaped stream channel which is wide open at the top, in the third concentric stream channel upwards, then once more back down etc. It is obvious that by this manner a very long turbulence stream of the flue gas is obtained due to wet stream channels filled with bubbles and hence also a very good cleaning effect.

The convoluted sheets 60 may consist of metal or plastic whereby diverting from the illustrated design example a pack of sheets maintained floating on the fluid 20 by means of float elements, this being movable in vertical direction in the frame 62, also comes into question. The vertical movements of the pack of sheets whose sheets otherwise are connected with one another in the same arrangement as in accordance with FIG. 5, produce a pump effect promoting the turbulence stream in the upper hollow space 66. The hollow space 66 can be fitted with upper openings e.g., in form of adjustable and closeable slots.

As a further alternative to the illustrated design form the left sheet with reference to FIG. 5 of each ring-shaped stream channel between the convoluted sheets 60 with an upper wide opening could be sealed up against the cover of the internal hollow space 66. A zig-zag path of the flue gas then results automatically, alternately upwards and downwards due to the concentric ring channels. The sheet 60 could also be cylindrically smooth or convoluted in another way. Yet another alternative foresees that the internal hollow space of the frame 62 instead of the sheets 60 contain a number of balls, e.g., made of polystyrol or another turbulence producing filling material.

This filling material can e.g., also have a porous, fibrous or sponge-shaped texture, for example made of steel wool or plastic. A multitude of small bubbles of the cleaning fluid are formed in this material which clean the flue gas flowing through the material. Thereby the material does not even have to extend into the cleaning fluid but may be arranged at a slight space above it.

Diverging from the arrangement in accordance with the FIG. 1, the basin 18 could also be located beneath the roof 10 and then the clean gas be fed via a pipe through the roof. A relatively large volume of the basin 18 can be gained in particular in the case of industrial chimneys, in such form that it extends in a ring-shape around the upper area of the chimney 12 with a metal jacket and is not only placed on top of it.

Water can be used as the cleaning fluid 20 to which, apart from a foam material, various materials can be added depending on the application, i.e., depending on the flue gas to be cleaned. As additives e.g., sodium tripolyphosphate for the provision of adhesion and isopropanol as a foam moderating medium come into question. The latter increases the rate and surface of foam bubbles which has a favourable effect, in particular, in the case of the design in accordance with FIG. 5. Further possible additive materials are soap type agents, flaking agents, enzymes, absorbing agents for the provision of the settlement of oil soot in the form of oil slurry and other materials available to the specialist for the wet cleaning of gases. In principle, the cleaning device in accordance with the invention is suitable for all types of exhaust gases to be passed through chimneys and for all of the cleaning fluids which come into question for their cleaning in each case.

I claim:

1. A device for the wet cleaning of flue gas drawn through a flue gas passage, said device comprising a hood covering the flue gas passage and a ring shaped basin surrounding the flue gas passage and containing a cleaning fluid including a foam forming additive, the hood including, at the lower edge thereof, turbulence creating means, extending into the basin below the surface of the cleaning fluid contained in the basin, for causing the flue gas to pass beneath the surface of the cleaning fluid, from above said surface, at least two separate times during travel of the flue gas from the flue gas passage to the surrounding atmosphere, said turbulence creating means comprising a plurality of spaced, enclosing obstructions extending into the basin below the surface of the cleaning fluid contained therein beneath which the flue gas must travel, and at least one hollow space defined between said obstructions which fills with foam produced by said foam forming additive and through which the flue gas flowing through the hollow space passes, the obstructions which comprise said turbulence creating means comprising a plurality of spaced, concentric, vertically extending sheets wherein the spaces between said sheets are at least partially connected together at the tops thereof through a common space at the top of the turbulence creating means and the lower edges of said sheets extend below the surface of the cleaning fluid contained in said basin, the sheets being of an accordion shape including rounded convolutions, and the convolutions of adjacent sheets being disposed in side by side relationship so as to form constrictions in the spaces between the sheets.

2. A device according to claim 1 wherein the turbulence creating means comprises a device which floats on the cleaning fluid.

3. A device in accordance with claim 1, wherein the radially innermost space between the sheets includes a wide opening at the bottom thereof and a narrow opening at the top thereof and the radially outermost space between the sheets includes a narrow opening at the bottom thereof and a wide opening at the top thereof.

4. A device in accordance with claim 1, further comprising a gas permeable foam barrier disposed in the basin in spaced relation above the surface of the cleaning fluid.

5. A device in accordance with claim 1, wherein the basin is connected to a fluid feed-line and includes an upper overflow opening which is connected to a collection tank.

6. A device in accordance with claim 1, further comprising a fan, located on the hood, for increasing the draft in the flue gas passage.

7. A device in accordance with claim 6 further comprising a motor for driving the fan.

8. A device in accordance with claim 6 wherein said fan is driven by wind power.

9. A device as claimed in claim 1 further comprising a fan, located on the basin, for increasing the draft in the flue gas passage.

10. A device in accordance with claim 9 further comprising a motor for driving the fan.

11. A device in accordance with claim 9 wherein said fan is driven by wind power.

12. A device for the wet cleaning of flue gas drawn through a flue gas passage, said device comprising a hood covering the flue gas passage and a ring shaped basin surrounding the flue gas passage and containing cleaning fluid including a foam forming additive, said hood including a lower peripheral portion which is submerged below the surface of the cleaning fluid contained in said basin and which comprises a turbulence creating means for forcing the flue gas beneath the surface of the cleaning fluid, from above said surface, at least two separate times after the flue gas has exited from said flue gas passage, said turbulence creating means comprising a plurality of spaced, enclosing obstructions below which flue gas is forced to pass after exiting from said flue gas passage and defining at least one hollow space therebetween which, in use, contains foam formed when the flue gas is forced beneath the surface of the cleaning fluid and through which the flue gas passes, said hollow space containing a porous gas and fluid permeable material.

13. A device in accordance with claim 12, wherein the hollow space includes outflow opening for the flue gas above the surface of the cleaning fluid.

* * * * *